Figure 1:
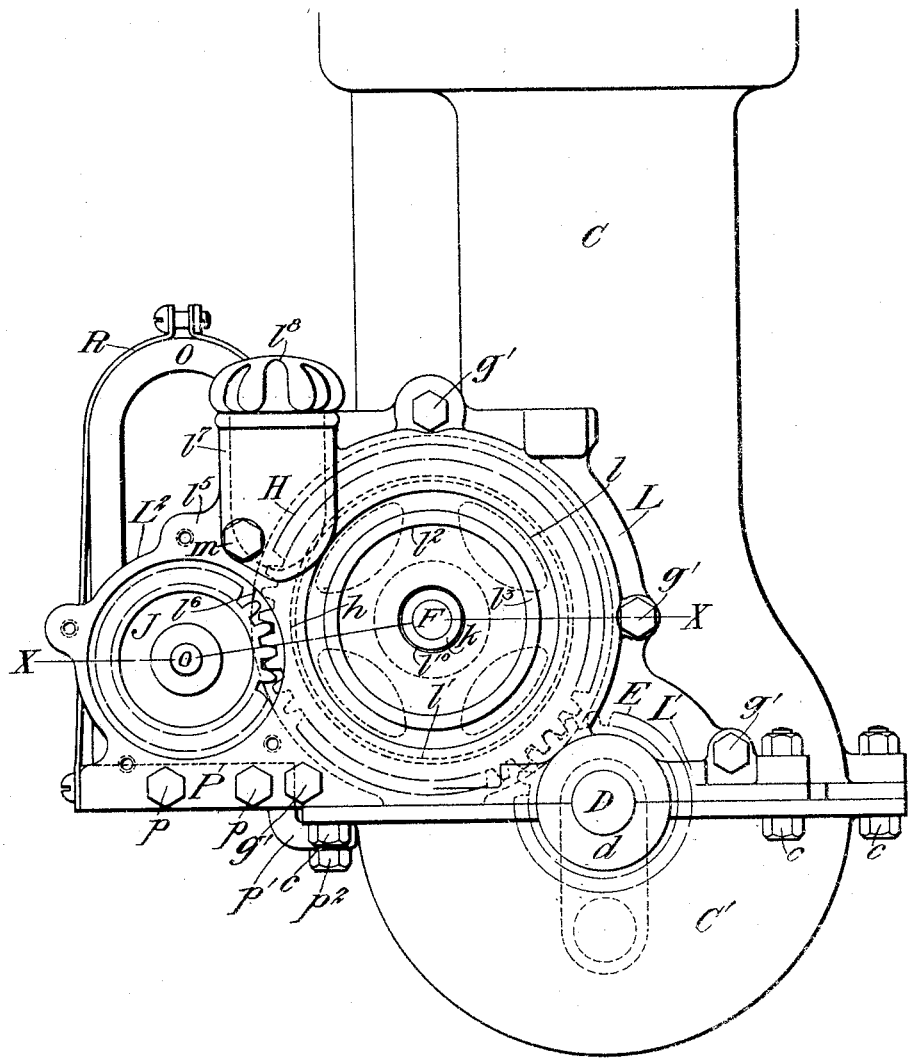

W. G. SWIFT.
ATTACHMENT FOR INSTALLING MAGNETOS ON GAS ENGINES.
APPLICATION FILED OCT. 27, 1913.

1,107,374.

Patented Aug. 18, 1914.

W. G. SWIFT.
ATTACHMENT FOR INSTALLING MAGNETOS ON GAS ENGINES.
APPLICATION FILED OCT. 27, 1913.

1,107,374.

Patented Aug. 18, 1914.
2 SHEETS—SHEET 2.

UNITED STATES PATENT OFFICE.

WALTER G. SWIFT, OF PROVIDENCE, RHODE ISLAND, ASSIGNOR OF ONE-HALF TO GEORGE F. BOHL, OF CRANSTON, RHODE ISLAND.

ATTACHMENT FOR INSTALLING MAGNETOS ON GAS-ENGINES.

1,107,374.   Specification of Letters Patent.   Patented Aug. 18, 1914.

Application filed October 27, 1913. Serial No. 797,482.

*To all whom it may concern:*

Be it known that I, WALTER G. SWIFT, a citizen of the United States, residing at Providence, in the county of Providence and State of Rhode Island, have invented certain new and useful Improvements in Attachments for Installing Magnetos on Gas-Engines, of which the following is a specification.

My invention relates to an improved attachment for internal-combustion motors or gas-engines for connecting a magneto to be driven therefrom.

The object of my improvement is to provide a simple form of direct drive between the motor and magneto, so arranged and assembled that it can be applied to standard types of motors now in use without requiring any material change in the construction thereof and without necessitating the drilling and tapping of additional holes in the engine castings or other machine work thereon.

My improved attachment is designed especially for the engines of "Ford" automobiles whereby a high-tension magneto can be connected thereto to provide an improved ignition system for the cylinders to increase the speed and power of the motor. I accomplish this purpose by substituting a novel and ingenious form of gear-housing section for the front plate or cover originally attached to the engine and employing therein two new gears adapted to be connected with the gear already in place on the crank-shaft. The new gears can be applied without any machining or fitting and the supplementary gear-housing section is attached with the same fastening means originally used. Furthermore, the new parts are so designed and arranged that they occupy practically the same space as the original ones and hence the timing mechanism and other connected parts can be used in their same positions without substitution or alteration.

The invention is fully described in the following specification, illustrated by the accompanying drawings, in which like reference characters designate like parts.

Figure 2:
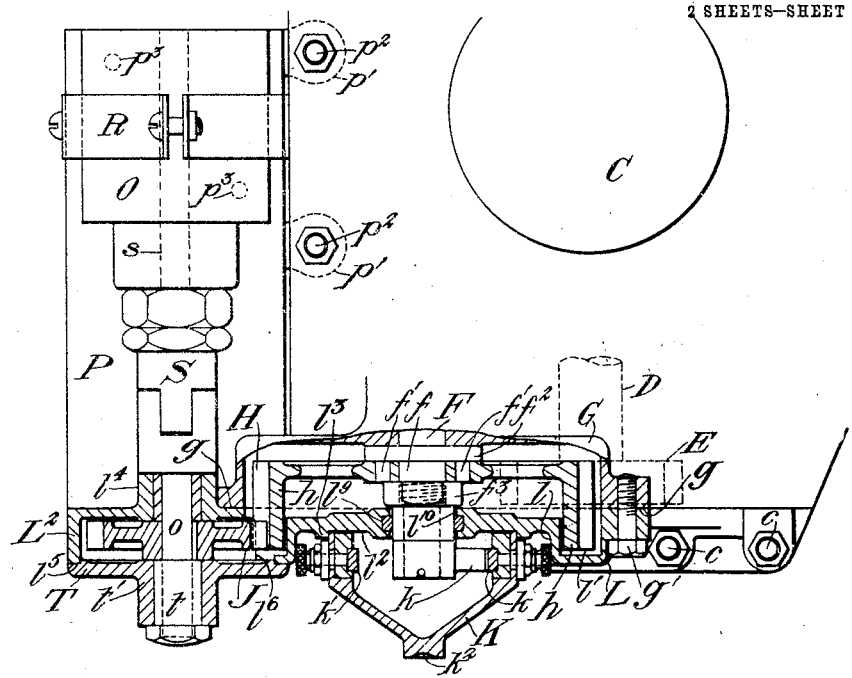
Figure 3:
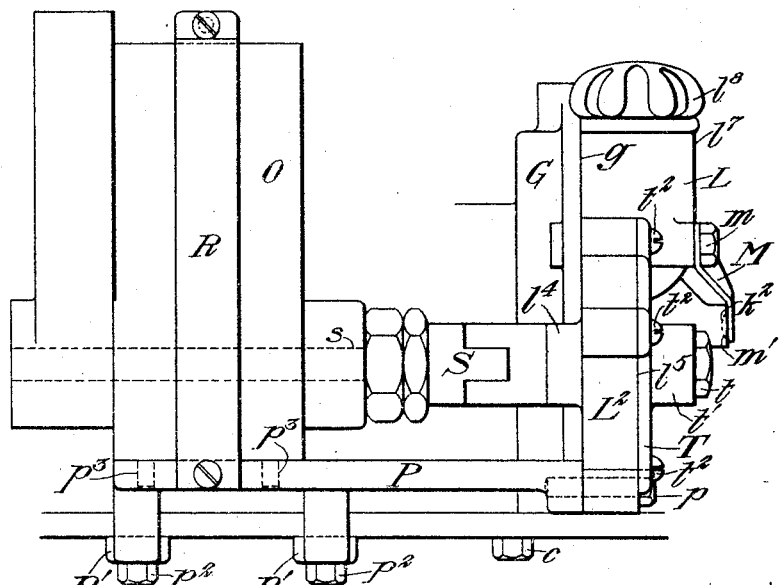

In the drawings:—Figure 1 is a front view of a usual type of gas-engine showing my new device applied thereto and illustrating the gear-case or housing with the cover and timer-box removed; Fig. 2 is a plan view showing the gear-housing in section on the line X—X of Fig. 1; Fig. 3 is a side view showing the method of supporting the magneto from the gear-housing.

Referring first to Fig. 1, C designates the cylinders of a gasolene engine of the "Ford" type and C' is the lower section of the crank-case supported therefrom by the bolts $c$, $c$, etc. D is the crank-shaft supported in the front bearing $d$ and carrying the usual spur gear E which drives the cam-shaft F. The parts above named are common to the type of engine specified and as usually arranged the cam-shaft F carries a spur gear adapted to mesh with the gear E and inclosed by a case or housing on the front of the main engine casting. The ignition system of this style of engine is ordinarily operated from a magneto built into the fly-wheel but it has been demonstrated that the efficiency of the motor can be greatly increased by using a separate high-tension magneto of some approved type. As before stated my improvement consists in providing a means for connecting the magneto to be driven from the cam-shaft and this is accomplished with a minimum number of new parts and without disturbing the arrangement of the timing-mechanism which is mounted on the front end of the cam-shaft. The usual timing-gear which meshes with the crank-shaft gear E to drive the cam-shaft F is located in a housing G which forms a part of the main cylinder casting C, see Fig. 2. The housing G is covered by a front plate or section, called the timing-gear plate, which is formed with a cap for the crank-shaft bearing $d$ and is bolted in place against the finished face $g$ of the housing G. The cam-shaft F projects through this plate and carries the commutator or timer which with my new arrangement is retained in its same location without alteration or disturbance of its structure or method of operation. In order to make it possible to utilize the commutator-mechanism as originally applied to the motor, without cutting away the timing-gear housing or any part of the crank-case, I have devised a novel form of supplementary gear-housing which takes the place of the original front plate or cover and can be secured to the engine with the same bolts. I also substitute a new form of gear for the original timing-gear and these two parts are practically all that is added except, of course, the magneto, and its driving-gear and coupling.

Referring particularly to Fig. 2, the new timing-gear H is constructed with an offset, overhanging rim $h$ which has approximately twice the width of face of the original gear. This adapts it to project outwardly beyond the face $g$ of the main gear-housing G so that its teeth may be brought into mesh with the teeth of the magneto-gear J. This latter gear must of necessity be located out beyond the face of the housing G, for otherwise the housing would have to be cut away at this point, and this is to be avoided in order not to mutilate the main engine casting. It will be noted that the gear H is mounted on a stud $f$ which forms an extension of the cam-shaft F, being held rotatively by the dowel pins $f'$, $f'$ and secured against a flange $f^2$ by a sleeved nut $f^3$, these parts remaining as originally provided so that no new fastening means are required for the gear.

When the commutator wiper $k$ is replaced on the cam-shaft F, as shown in Fig. 2, the timer-case or box K must be located in the same position as formerly in order that the contacts $k'$ etc. may have their proper relation to the wiper. To provide for this I construct my new, supplementary gear-housing section L with its front wall let in or recessed in circular form at $l$ and this provides an interior, annular channel $l'$ for the rim of the timing-gear H. The face $l^2$ of the recessed portion $l$ is finished off to provide a bearing for the circular rim of the timer-box K and I also form an annular flange $l^3$ on the front face of the housing-section which is adapted to surround the rim of the box K to centralize the latter with the axis of the cam-shaft F. For holding the timer-box in position I use the same spring-arm or clamp M originally employed and this is secured to the housing L by a bolt $m$, as shown in Fig. 3, with its ball-shaped end $m'$ engaging a recess $k^2$ in the front of the box K, see also Fig. 2.

Referring again to Fig. 1, the new gear-housing section L is formed with a bearing cap L' corresponding to the one on the regular housing front-plate which it replaces, and is adapted to fit exactly to the front of the main housing G to which it is secured by the original bolts $g'$, $g'$, etc. At its left-hand-side, as viewed in Fig. 1, the housing-section L is formed with an integral extension $L^2$ adapted to surround the magneto-gear J and provided with a rearwardly-extending bearing $l^4$ for the magneto stud-shaft $o$. The magneto O, which may be of any well known type, is secured on a shelf or table P which is supported from the housing-section L by means of the bolts $p$, $p$, see Figs. 1 and 3. To steady the table I attach it to the crank-case of the engine by means of the laterally extending lugs $p'$, $p'$ adapted to receive the bolts $p^2$, $p^2$ which secure the lower crank-case section to the main engine casting. This connection of the table to the engine proper is preferably a loose one, however, so that the main support for the magneto will be on the housing-section L in order to take the torque at this latter point. The magneto O is held in position on the table P by suitable dowel-pins $p^3$, $p^3$, and is secured by the usual strap R. The magneto shaft $s$ is connected to the stud-shaft $o$ by a "Universal" or "Oldham" coupling S. The outer end of the stud-shaft $o$ has a bearing in a sleeve $t$ which is supported in a hub $t'$ forming part of a cover-plate T. The cover-plate T is fitted to the finished face $l^5$ of the housing-section L and is secured thereto by suitable screws $t^2$, $t^2$, etc.

Referring to Figs. 1 and 2, it will be noted that the casting of the housing-section L is cored out at $l^6$ to provide an opening through which the rim of the timing-gear H projects to adapt its teeth to mesh with those of the magneto-gear J. Referring to Figs. 1 and 3, the housing-section L is provided with a vertical, cylindrical extension $l^7$ which serves as a breather-tube and oil-inlet and is adapted to receive the original cap or stopper $l^8$. A felt washer $l^9$, see Fig. 2, is fitted to the opening $l^{10}$ of the housing-section L through which the end of the cam-shaft F projects to prevent leakage of oil at this point; and when the housing-section and cover-plate T are bolted snugly in place as described the whole forms an oil-tight casing which completely covers and protects all of the gears and bearings.

The principal object of my improvement has been to provide for installing a magneto in connection with an engine of the type specified without interfering with the use of the regular equipment. My new attachment can be applied without cutting away or mutilating the main engine castings, and with the addition of but very few parts. These parts consist merely of three new castings, the housing-section, cover and magneto table, and only two new gears. One of these gears replaces the regular timing-gear so that it can be said that only one gear is added to those already used on the engine. Other arrangements sometimes used for the same purpose require as many as three new gears and hence my new device shows considerable simplification in this respect. The parts of my new attachment are so few in number and so simple that they can be manufactured at a comparatively small cost and, besides, they are much easier to install. It does not require a machinist or expert mechanic to apply the improved attachment to the motor, but, as a matter of fact, with a few simple directions a novice can make the installation in a comparatively short time. When the installation is completed a very simple, compact, driving connection is made which performs its duty more efficiently and with less liability of getting out of order than any other arrangement ever devised for the same purpose. Besides taking up much less space than other systems it requires fewer new parts and is thus less expensive to manufacture and easier to install.

It will be understood that I do not herein claim broadly a system of gearing for connecting a magneto with an engine, but only the particular features of novelty of my device which consist essentially in the ingenious construction and combination of the elements described. Slight modifications might be made in the form and arrangement of the parts without departing from the spirit or scope of the invention.

Therefore without limiting myself to the exact embodiment shown and described, what I claim is:—

1. In an attachment for installing magnetos on gas-engines of the "Ford" type, the combination with the main engine casting and the cam-shaft projecting therefrom, of a substitute timing-gear formed with an overhanging rim having an extended tooth-face and adapted to be mounted on the cam-shaft with the said overhanging rim projecting beyond the front face of the engine casting, a magneto-drive-gear arranged to mesh with the teeth on the projecting rim of the timing-gear, a gear-housing section formed with an interior, annular recess arranged to receive the overhanging rim of the timing-gear and adapted to be bolted to the engine casting to inclose both gears, and a stud-shaft extending rearwardly from the magneto-gear through the gear-housing section to adapt it to be connected with the magneto.

2. In an attachment for gas-engines of the "Ford" type adapted to connect a magneto to be driven therefrom, the combination with the main engine casting and the cam-shaft mounted in bearings therein, of a substitute timing-gear formed with an overhanging rim having an extended tooth-face and adapted to be mounted on the end of the cam-shaft with its rim projecting beyond the front face of the engine casting, a magneto-drive-gear arranged to mesh with the teeth on the projecting rim of the timing-gear, a stud-shaft for connecting the magneto to its drive-gear, and a gear-housing section fitted to the front of the engine casting and adapted to inclose both gears, said housing-section formed with an annular channel adapted to receive the overhanging rim of the timing-gear and a recessed front wall set in from the gear-inclosing portion to allow the replacement of the commutator on the cam-shaft in its original position without disturbing the relation of its parts.

3. In an attachment for installing magnetos on gas-engines of the "Ford" type, the combination with the main engine casting and the cam-shaft projecting therefrom, of a substitute timing-gear formed with an overhanging rim having an extended tooth-face, and adapted to be mounted on the cam-shaft with the said overhanging rim projecting beyond the front face of the engine casting, a magneto-drive-gear arranged to mesh with the teeth on the projecting rim of the timing-gear, a gear-housing section formed with an interior, annular recess arranged to receive the projecting rim of the timing-gear and adapted to be bolted to the engine casting to inclose both gears, a table bolted to the gear-housing section and extending rearwardly therefrom, a magneto mounted on said table, and means to connect the magneto to be operated from the drive-gear.

4. In a magneto driving-connection for "Ford" engines, the combination with the main engine casting and the cam-shaft projecting therefrom, of a substitute timing-gear formed with an overhanging rim having a tooth-face of substantially twice the width of the original gear which it replaces and adapted to be mounted on the projecting end of the cam-shaft with its overhanging rim extending beyond the front face of the engine casting, a magneto-drive-gear arranged in position outwardly from the front face of the engine casting to adapt it to mesh with the overhanging portion of the timing-gear, a stud-shaft driven from said magneto-gear, and a gear-housing section formed with a bearing for the stud-shaft and adapted to be bolted to the engine casting to inclose both gears.

5. In an attachment for gas-engines of the "Ford" type, the combination with a timing-gear formed with an overhanging rim having an extended tooth-face, of a gear-housing section adapted to be bolted to the front face of the engine casting and formed with a cap for the crank-shaft bearing, an annular, interior recess adapted to receive the overhanging rim of the timing-gear, an exteriorly-recessed wall for receiving the commutator, an extension formed with a bearing for the magneto drive-shaft and a flanged inclosure for the magneto drive-gear, and a plate fitted to the outside of the housing to cover the drive-gear.

In testimony whereof I affix my signature in presence of two witnesses.

WALTER G. SWIFT

Witnesses:
 GEORGE A. WHITE, Jr.
 HERBERT K. ALLARD.